July 3, 1962 D. M. KNOX 3,041,762
PICTURE DISPLAYS
Filed March 16, 1960 2 Sheets-Sheet 1
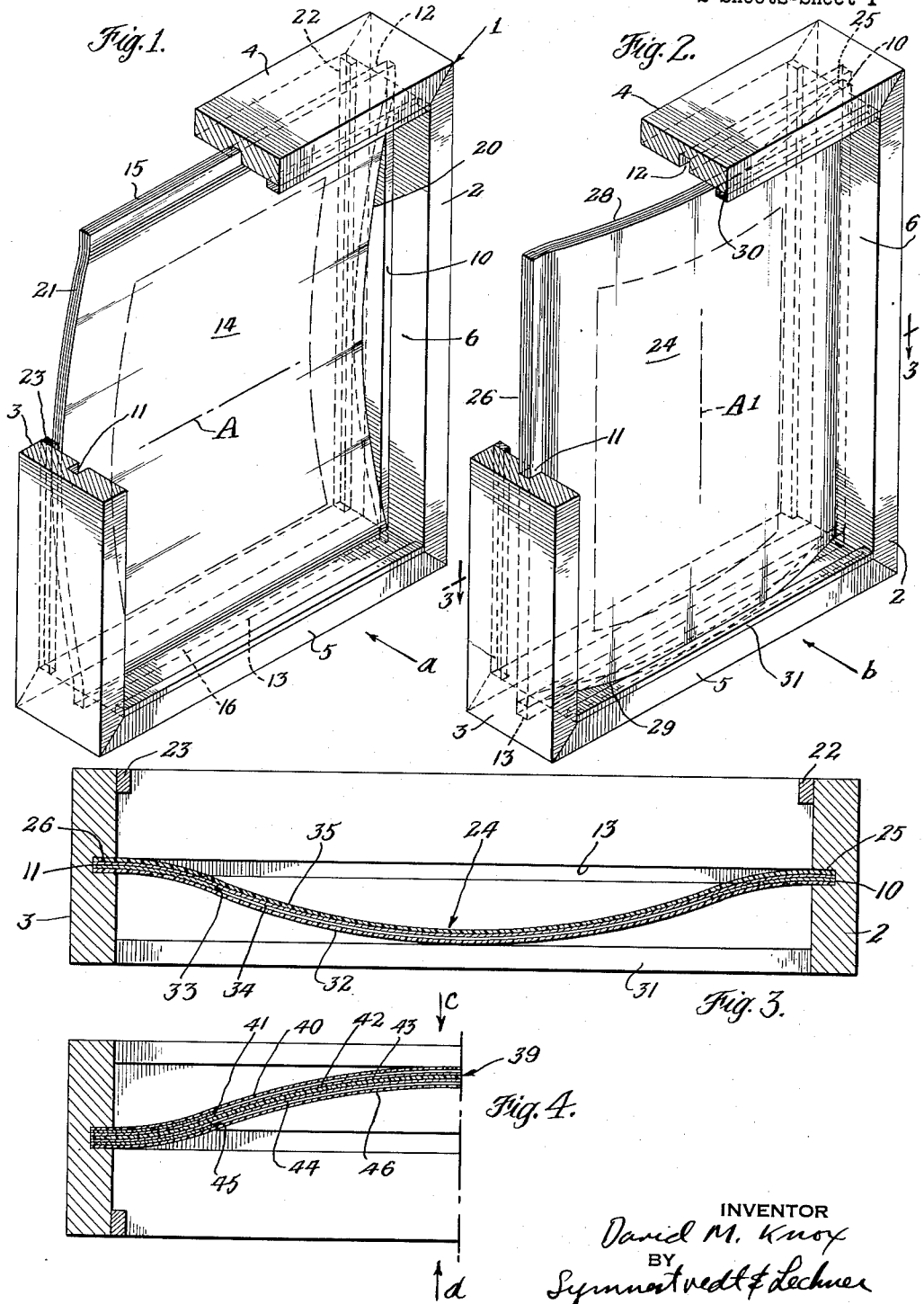
INVENTOR
David M. Knox
BY
Symmestvedt & Lechner
ATTORNEYS July 3, 1962     D. M. KNOX     3,041,762
PICTURE DISPLAYS
Filed March 16, 1960     2 Sheets-Sheet 2
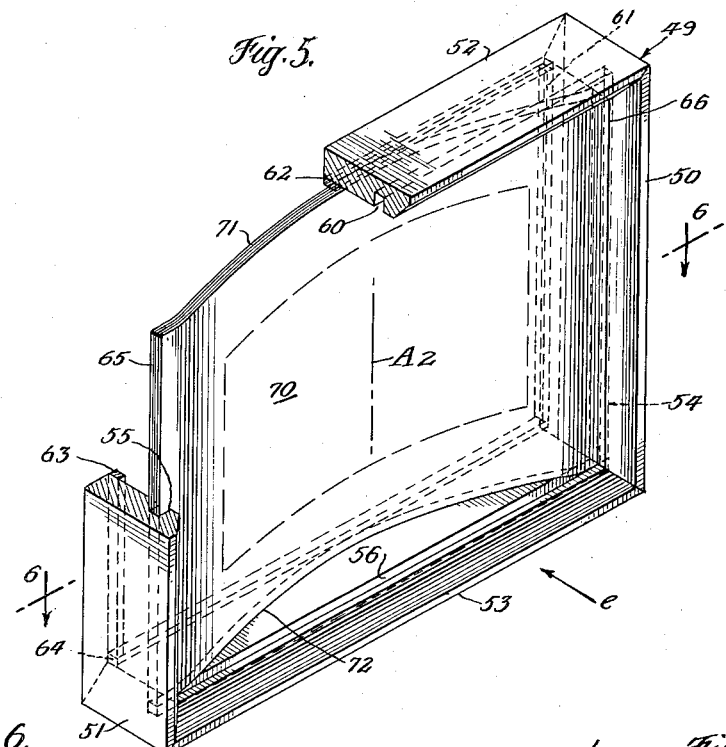
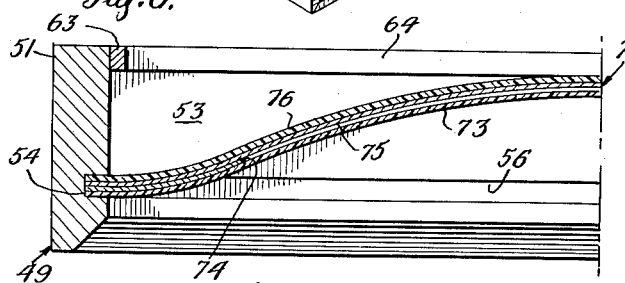
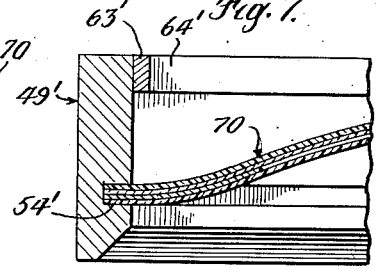
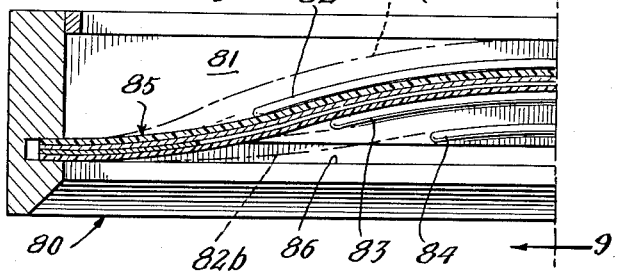
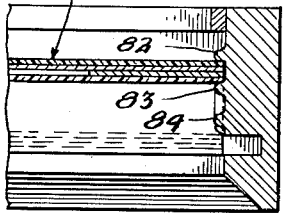
INVENTOR
David M. Knox
BY
Synnestvedt & Lechner
ATTORNEYS

United States Patent Office 3,041,762
Patented July 3, 1962

3,041,762
PICTURE DISPLAYS
David M. Knox, 310 E. 55th St., New York 22, N.Y.
Filed Mar. 16, 1960, Ser. No. 15,486
2 Claims. (Cl. 40—152)

This invention relates to equipment for the displaying of pictures and the like.

In one aspect the invention contemplates a picture display ensemble including a frame and picture assembly constructed so that the assembly is supported in the frame without the use of nails, tacks, screws or other like fastening means.

In another aspect the invention contemplates a picture display ensemble including a frame and a flexible picture assembly, the dimensions and the flexibility of the assembly providing for the same to be insertable through the frame aperture and then expandable into support means within the frame which holds the assembly without the use of fastening devices.

In another aspect the invention contemplates a picture display ensemble including a frame and a flexible picture assembly, the dimensions and flexibility of the assembly providing for the same to be insertable through the frame aperture and held in the frame by edges of the assembly being removably disposed in grooves in the frame.

In another aspect the invention contemplates a picture display ensemble including a frame and a flexible picture assembly supported in the frame with freedom to be bent or flexed into a contoured shape to provide a three-dimensional viewing effect for the picture.

In another aspect the invention contemplates a picture display ensemble including a frame and a flexible picture assembly supported in the frame along two opposite edges and with freedom to be bent or flexed into a contoured shape to provide a three-dimensional viewing effect for the picture.

In another aspect the invention contemplates a picture display ensemble including a frame and a flexible picture assembly supported in the frame with freedom to be bent or flexed into a contoured shape to provide a three-dimensional viewing effect for the picture together with means to control the degree of contouring.

In another aspect the invention contemplates a picture display ensemble including a frame and a flexible picture assembly supported in the frame with freedom to assume a planar condition or to be bent or flexed into a contoured shape to provide a three-dimensional viewing effect for the picture.

In another aspect the invention contemplates a picture display ensemble including a frame and a flexible picture assembly supported in the frame with freedom to be bent or flexed into a contoured shape to provide a three-dimensional viewing effect for the picture together with friction means engaging the unsupported edges and controlling the degree of contouring.

In another aspect the invention contemplates a picture display ensemble including a frame and a flexible picture assembly, the dimensions and flexibility of the assembly providing for the same to be flexed or bent for insertion into the frame and also providing for the assembly, while so disposed, to be flexed into a contoured shape to provide a three-dimensional viewing effect for the picture.

The manner in which the invention is constructed will be explained in connection with the following description and drawings wherein:

FIGURE 1 is an isometric view of a picture ensemble constructed in accordance with the invention with the picture assembly disposed to provide a three-dimensional viewing effect;

FIGURE 2 is an isometric view of a picture ensemble of FIGURE 1 with the picture assembly arranged to provide a different three-dimensional effect;

FIGURE 3 is an enlarged plan section taken along the lines 3—3 of FIGURE 2;

FIGURE 4 is a fragmentary plan section illustrating in particular a different type of flexible picture assembly;

FIGURE 5 is an isometric view of a picture ensemble constructed in accordance with the invention with the picture assembly being disposed to provide a still further variation in three-dimensional viewing effects.

FIGURE 6 is a one-half plan section on the line 6—6 of FIGURE 5;

FIGURE 7 is a fragmentary plan section showing a modification of the construction of FIGURE 5;

FIGURE 8 is a one-half plan section showing a typical friction means provided on the frame for controlling the degree of contour or flexing of the flexible picture ensemble; and FIGURE 9 is a plan section taken on the line 9—9 of FIGURE 8.

The term "three-dimensional" as used herein is meant that the picture is supported so that as viewed it appears to have not only dimensions in length and width, but also a dimension in depth or in a direction along the viewing axis.

In FIGURE 1 the frame 1 is generally rectangular in shape and comprises the long sides or moldings 2 and 3 and the short sides or moldings 4 and 5. As indicated, the inner part of each of the sides 2, 3, 4 and 5 is planar. The generally rectangular construction forms a viewing aperture 6.

The long sides 2 and 3 have grooves 10 and 11; the short sides 4 and 5 have grooves 12 and 13. These grooves are coplanar, so to speak, and in effect form a continuous groove around and open to the aperture 6.

Within the aperture 6 is disposed the flexible picture assembly 14. The edges 15 and 16 of the assembly are respectively disposed in the grooves 12 and 13. The grooves 12 and 13 form supporting means for the assembly. The contact or engagement between the edges 15 and 16 and the grooves 12 and 13 is firm but such that the edges are free to move relative to the grooves. The other edges of the assembly, namely, the edges 20 and 21, are adjacent to the sides 2 and 3 but are unsupported so as to be free to move. The distance between the edges 20 and 21 is slightly less than the distance between the inner parts of the sides 2 and 3.

At the far end of the aperture 6 are located the retaining strips 22 and 23 respectively disposed on the sides 2 and 3. As indicated, the central portion of the flexible assembly 14 abuts the strips.

The manner of supporting the edges 15 and 16, the freedom of the edges 20 and 21 and the flexibility of the assembly all cooperate to permit the assembly to be flexed or bent into a contoured shape which, as shown, is concave as viewed in the direction indicated by arrow *a*.

The degree of contouring in the embodiment of FIGURE 1 is fixed and this is determined as follows. The length of the assembly 14 between the edges 15 and 16 (when the same is flat) is greater than the distance between the bottoms of the grooves 12 and 13 so that the edges are firm against the bottoms of the grooves and the central portion of the assembly is forced to bend, preferably rearwardly, until the central portion abuts the strips 22 and 23. Where more or less fixed contouring is desired, the grooves holding the edges may be provided with appropriately dimensioned filler strips.

While the retaining strips are not essential, they serve the very useful and desirable purpose of serving as a barrier to prevent accidental discharging of the assembly and also serve to cause all parts of the assembly to be in tight engagement.

In FIGURE 1 it will be observed that the long sides 2 and 3 run vertically and that the axis A of the contour runs horizontally or parallel the short sides 4 and 5. It will be understood, of course, that the frame may be oriented so that the short sides and the axis A run vertically.

To discharge or remove the assembly 14 from the frame it is only necessary to push on the central part of the assembly (from the far side) until the edges 15 and 16 come out of the grooves 12 and 13 and with further movement the assembly is free from the frame. To insert the assembly in the frame it is simply necessary to put, say, the edge 15 in the groove 12 and then bend or flex the assembly while pushing inwardly until the edge 16 slips into the groove 13.

As will be apparent, the above-described construction makes for an ensemble wherein the picture is supported in the frame without nails, brads, stop plates and the like. This has a distinct advantage from the standpoint of picture frame manufacture since it eliminates a large portion of the hand work involved where pictures are supported in frames by conventional methods. Where the frame is made from wood or metal, the only hand work involved is in joining the various moldings making up the frame at the mitered joints. Even this hand work may be eliminated where the frame is cast as a unitary piece, for example, from plastic.

Furthermore, it is to be observed that the picture assembly is inserted in or removed from the frame essentially by binding or flexing the assembly and pushing in the appropriate direction. This has special advantage from the manufacturing standpoint because of the elimination of the hand work involved where the picture is inserted and supported in a conventional manner. So too, this feature makes it convenient and easy for the decorator to change the picture to fit the same into a new or revised decorating scheme.

The above-mentioned structure also provides a very simple and inexpensive means for obtaining three-dimensional viewing effects. A three-dimensional effect is highly desirable because it imparts a more life-like quality to the picture and enhances its aesthetic appearance and allows a ready adaptability for unusual display and decorating schemes.

In FIGURE 2 I have shown how the frame of FIGURE 1 with a different picture assembly is used to create a different viewing effect.

In FIGURE 2 the assembly 24 has its edges 25 and 26 respectively disposed in the grooves 10 and 11. Edges 28 and 29 are unsupported and free to move, the distance between the edges 28 and 29 being slightly less than the distance between the interior of the sides 4 and 5. The assembly 24 is inserted in the frame or removed therefrom in the manner as described in connection with the assembly 14. The distance between the edges 25 and 26 of the assembly 24 is greater than the distance between the bottoms of the grooves 10 and 11 so that with the edges 25 and 26 disposed in the grooves, the assembly assumes the contoured shape as shown. Note that the center portion of the assembly engages the strips 30 and 31.

In FIGURE 2 it will be noted that the contoured shape of the assembly 24 is convex as viewed in the direction indicated by the arrow b and that the contour axis $A_1$ runs vertically.

The construction of a typical assembly is shown in FIGURE 3. This comprises a flexible transparency 32 preferably made of acetate or vinyl plastic, a mat 33 made of flexible material such as paper or plastic, a picture 34 on flexible paper and a backing sheet 35 also made of flexible paper or plastic. The degree of flexibility of the foregoing elements is such that the assembly can be easily bent for the purposes outlined above. The materials mentioned above are preferred since they have a certain amount of resiliency which is useful in snapping the assembly in or out of the frame and in making the contour.

In FIGURE 4 I have shown the construction of another picture assembly 39 including a pair of pictures and wherein one of the pictures has a concave contour as viewed from one side of the frame and the other picture has a convex contour as viewed from the opposite side of the frame. The assembly 39 may be substituted for either of the assemblies 14 and 24. The assembly of FIGURE 4 includes transparency 40, mat 41, picture 42, intermediate backing sheet 43, a picture 44, a mat 45 and a transparency 46. All of the foregoing elements are made of flexible material. The picture 42 when viewed in the direction of the arrow c is concave and the picture 44 when viewed in the direction of the arrow d is convex.

In the ensemble of FIGURE 1 the grooves 10, 11, 12 and 13 are located centrally of the frame. Where it is desired to obtain a deeper three-dimensional effect, the grooves may be set off-center or toward one edge of the frame. This construction is shown in FIGURE 5.

The frame 49 of FIGURE 5 comprises the short sides 50 and 51 and long sides 52 and 53. The short sides have the grooves 54 and 55 and the long sides have the grooves 56 and 60. Retaining strips 61, 62, 63 and 64 are disposed toward the rear of the aperture. The ends 65 and 66 of the picture assembly 70 are respectively disposed in the grooves 54 and 55. The ends 71 and 72 are unsupported and free to move.

In FIGURE 5 it will be noted that the short side of the frame and the contour axis $A_2$ both extend vertically and the viewing effect is concave looking in the direction of the arrow e. When a convex effect is desired an assembly having its edges supported in the grooves 56 and 60 is used. In either of the foregoing arrangements the frame may be oriented with its long sides extending vertically.

FIGURE 6 shows the construction of the assembly 70. This comprises the transparency 73, mat 74, picture 75 and back sheet 76, all made of flexible material.

In FIGURE 7 I have shown how the degree of contour may be controlled by adjusting the depth of the supporting grooves and the thickness of the retaining strip. In FIGURE 7 the frame 49' has groove 54' (and other grooves not shown) which is deeper than the groove 54 of FIGURE 5. Also, the retaining strip 63' and 64' (and other retaining strips not shown) are wider than the strips 63 and 64 of FIGURE 5. Thus, the assembly 70, when disposed in the frame 49', will be more flat or of less contour than when disposed in the frame 49.

In FIGURES 8 and 9 I have shown friction means for controlling the degree of bending or contouring. The frame 80 has one or more of its sides, for example the side 81, provided with friction means or corrugations 82, 83 and 84 slidably engaging the assembly. (The size of these corrugations has been exaggerated for descriptive purposes.) The picture assembly 85 is disposed between the ribs 82 and 83. If the assembly is moved so that it is behind the rib 82 (indicated by dot and dash lines 82a) then a deeper contoured effect is provided. Where the assembly is held between the ribs 83 and 84 (indicated by dotted line 82b) a flatter contoured effect is provided. The assembly may be planar or not bent at all by positioning the assembly in front of the rib 84. In this latter instance the slot 86 in the side 81 may be provided with a filler strip (not shown) which holds the assembly out of the slot.

It will be understood, of course, that the grooves supporting the edges of the assembly are of a depth sufficient to permit the assembly to assume a planar or bent condition.

I claim:
1. An ensemble for the display of pictures or the like comprising:
   a frame formed with first and second planar, rectangular shaped surfaces oriented parallel with each other and also formed with third and fourth planar, rectangular shaped surfaces oriented parallel with one another and also normal to the first and second planar surfaces, the planar surfaces forming a rectangular shaped aperture;
   means forming grooves respectively on said first and second planar surfaces, each groove being generally rectangular in cross section and the grooves facing one another;
   a picture assembly in said aperture comprising a picture and sheet means supporting the picture, both the picture and the sheet means being made of flexible material, the dimensions of the picture assembly as between the first and second planar surfaces being greater than the distance between the surfaces to provide for two opposite edges of said assembly to be disposed in and make a sliding contact respectively with said grooves, and the dimensions of the picture assembly as between the third and fourth planar surfaces being substantially the same as the distance between the surfaces to provide for the other two edges of said assembly to respectively make sliding contacts with said third and fourth planar surfaces, the said flexibility and the said sliding contact of said edges both providing for the assembly to be freely bendable into a contoured shape; and
   retaining strips on said third and fourth planar surfaces engaged by said assembly when the same is bent into contoured shape.

2. A construction in accordance with claim 1 further including friction means on said third and fourth planar surfaces to respectively engage said other two edges, the friction means being for use in controlling the degree of bending of said assembly.

References Cited in the file of this patent

UNITED STATES PATENTS

| | | |
|---|---|---|
| 678,012 | Maratta | July 9, 1901 |
| 2,242,148 | Sanders | May 13, 1941 |
| 2,565,553 | Foley | Aug. 28, 1951 |
| 2,731,749 | Tarzian | Jan. 24, 1956 |
| 2,860,437 | Carroll | Nov. 18, 1958 |
| 2,862,322 | Ziegler | Dec. 2, 1958 |
| 2,961,789 | Hughes | Nov. 29, 1960 |
| 2,971,282 | Petrey | Feb. 14, 1961 |

FOREIGN PATENTS

| | | |
|---|---|---|
| 611,444 | France | July 5, 1926 |
| 1,088,058 | France | Sept. 1, 1954 |